(12) United States Patent
Handrich et al.

(10) Patent No.: US 6,539,799 B1
(45) Date of Patent: Apr. 1, 2003

(54) ROTATIONAL SPEED MEASUREMENT DEVICE FOR ROTATING MISSILES

(75) Inventors: Eberhard Handrich, Kirchzarten (DE); Hermann Hog, Schallstadt (DE)

(73) Assignee: LITEF GmbH (DE)

( * ) Notice: Subject to any disclaimer, the term of this patent is extended or adjusted under 35 U.S.C. 154(b) by 0 days.

(21) Appl. No.: 09/582,680

(22) PCT Filed: Dec. 21, 1998

(86) PCT No.: PCT/EP98/08393
§ 371 (c)(1),
(2), (4) Date: Jun. 29, 2000

(87) PCT Pub. No.: WO99/35466
PCT Pub. Date: Jul. 15, 1999

(30) Foreign Application Priority Data

Dec. 30, 1997 (DE) .......................................... 197 58 223

(51) Int. Cl.$^7$ ................................................. G01P 9/04
(52) U.S. Cl. .................... 73/493; 73/504.02; 73/504.12
(58) Field of Search ........................ 73/504.02, 504.12, 73/504.16, 493, 510, 514.39, 178 R; 318/649; 701/220; 244/3.2

(56) References Cited

U.S. PATENT DOCUMENTS 4,848,158 A  *  7/1989  Egli et al. ................. 73/514.39
5,067,084 A     11/1991 Kau ............................ 73/510

FOREIGN PATENT DOCUMENTS

WO         WO 963871        12/1996

* cited by examiner

Primary Examiner—John E. Chapman
(74) Attorney, Agent, or Firm—Elliott N. Kramsky

(57) ABSTRACT

A spin rate measurement device for rotating missiles. Preferably, three micromechanical spin rate sensors whose three spatial axes are aligned at right angles to one another, each of which is designed to be excited, read and reset capacitively, are arranged on a single platform that can be rotated by means of a servo loop for rotation decoupling. The spin rate measurement device is distinguished by high bias and scale factor stability that can be checked at any time.

4 Claims, 3 Drawing Sheets

ROTATIONAL SPEED MEASUREMENT DEVICE FOR ROTATING MISSILES

BACKGROUND

1. Field of the Invention

The present invention relates to rotation or spin measurements for rotating missiles. More particularly, this invention pertains to apparatus for rotation or spin measurement for stabilization of rotating missiles.

2. Description of the Prior Art

The ability to measure and process high roll spin rates of rotating missiles (e.g., 5000 to 10,000°/s) is a fundamental requirement of a flight attitude stabilization device for maintaining specific roll, pitch and azimuth angles with respect to an initial position.

The options for solving this fundamental problem are briefly outlined below:

(a) spin-stabilized two-axis integrating gyro systems (i.e., cold gas or powder gyro arrangements);

(b) optical gyro systems having high spin rate capacity and scale factor stability, (e.g., ring laser or fiber optic gyros);

(c) vibration gyroscopes based on the Coriolis principle in which symmetrical oscillator structures oscillate within a plane subject to as little damping as possible and provide high scale factor of accuracy.

The first two approaches ("a" and "b") satisfy the technical requirements while incurring excessive unit costs. In the traditional, mechanical integrating solution (proposal a), the gyro systems are constructed from mechanical parts which, from the beginning, offer economies when relatively large quantities are employed. This solution suffers the substantial disadvantage that functional tests prior to missile launch are possible only to a limited extent. In practice, such tests can only be carried out on a sample test basis because it is too risky due to particles to renew or replace the gas or powder reservoir. This is possible only at a considerable cost and this solution suffers under limited reliability because of the testability restrictions.

The bias of optical gyro systems according to proposal b can be readily checked, even after long storage times. High scale factor accuracy is required to measure high spin rates and can only be checked with difficulty. Expensive tests on rotating tables are unacceptable after the missile has been stored for a long period of time. Proposals exist for monitoring the scale factors of ring lasers and fiber optic gyros within systems, with accuracy requirements of, e.g., 0.02%, over storage times of up to 20 years. However, unit costs for optical gyros become unacceptably high, even when the fact that optical components and assemblies are becoming ever cheaper due to newer production methods is taken into account.

Initially, a vibration gyroscope according to proposal "c" would appear to offer a highly promising solution to the problem. Induced vibration in an ideal resonator with high Q-factor retains its inertial orientation even at high roll rates. Thus, in theory, an ideal spin-rate integrating gyroscope system is possible. However, known resonators cannot, in fact, be produced with such ideal characteristics. Tuning fork oscillators, as well as ring or circular oscillator systems, for example, have a number of oscillation modes and natural frequencies that must be matched to one another. Thus, ring oscillator configurations, for example, do not maintain their inertial orientations due to the Bryan factor. Theoretically, an output oscillation angle of about 60% with respect to the input angle is obtained. However, the 60% discrepancy depends upon the actual natural modes and respective mechanical coupling. Should they change, due to external vibration or shocks during storage, the scale factor then changes. As a result the 0.02% accuracy requirement cannot be satisfied over a relatively long storage period.

In the case of double tuning fork oscillators, the Bryan factor is virtually 100%. Discrepancies of about 1.3% must be taken into account, so that the required scale factor stability of 0.02% is virtually impossible to achieve after storage for up to 20 years. Furthermore, checking involves major practical difficulties.

A further problem of both vibration gyroscope concepts results from unavoidable damping. In practice, to insure operation as a spin rate integrating gyroscope, damping must be electronically overcome (at least for the two modes employed). Constant excitation is required for the initial vibration mode. Damping for the other oscillation mode must be overcome, for example, by electronic torquers, without forcing such oscillation mode absent Coriolis forces. If the damping cannot be correctly overcome, considerable errors will occur in integrating gyroscopes, perhaps sufficient for the two oscillation modes to become unstable.

To compensate for temperature-dependent gas damping, vibration gyroscopes would have to be operated in a vacuum, particularly for miniaturized designs. It is, however, difficult and expensive to maintain a stable small volume vacuum over long storage times (up to 20 years).

SUMMARY AND OBJECTS OF THE INVENTION

It is therefore an object of the present invention to provide a spin rate measurement device for stabilizing the track attitude of rotating missiles.

It is a further object of this invention to achieve the above object while obtaining high bias and scale factor stability in a missile that has been stored for a long time.

It is yet another object of the present invention to achieve the foregoing objects with a device having good testability and low unit costs.

The present invention achieves the above and other objects by providing a spin rate measurement device for rotating missiles. Such device includes at least one micromechanical spin rate sensor. The sensor is mounted on a platform. One axis of the platform can be driven in a controlled manner by means of a servo loop for rotation decoupling of the spin rate sensor.

The preceding and other features of the invention will become further apparent from the detailed description that follows. Such description is accompanied by a set of drawing figures. Numerals of the drawing figures, corresponding to those of the written description, point to the features of the invention with like numerals referring to like features throughout both the written text and the drawing figures.

DETAILED DESCRIPTION OF THE PREFERRED EMBODIMENT

Figure 1:
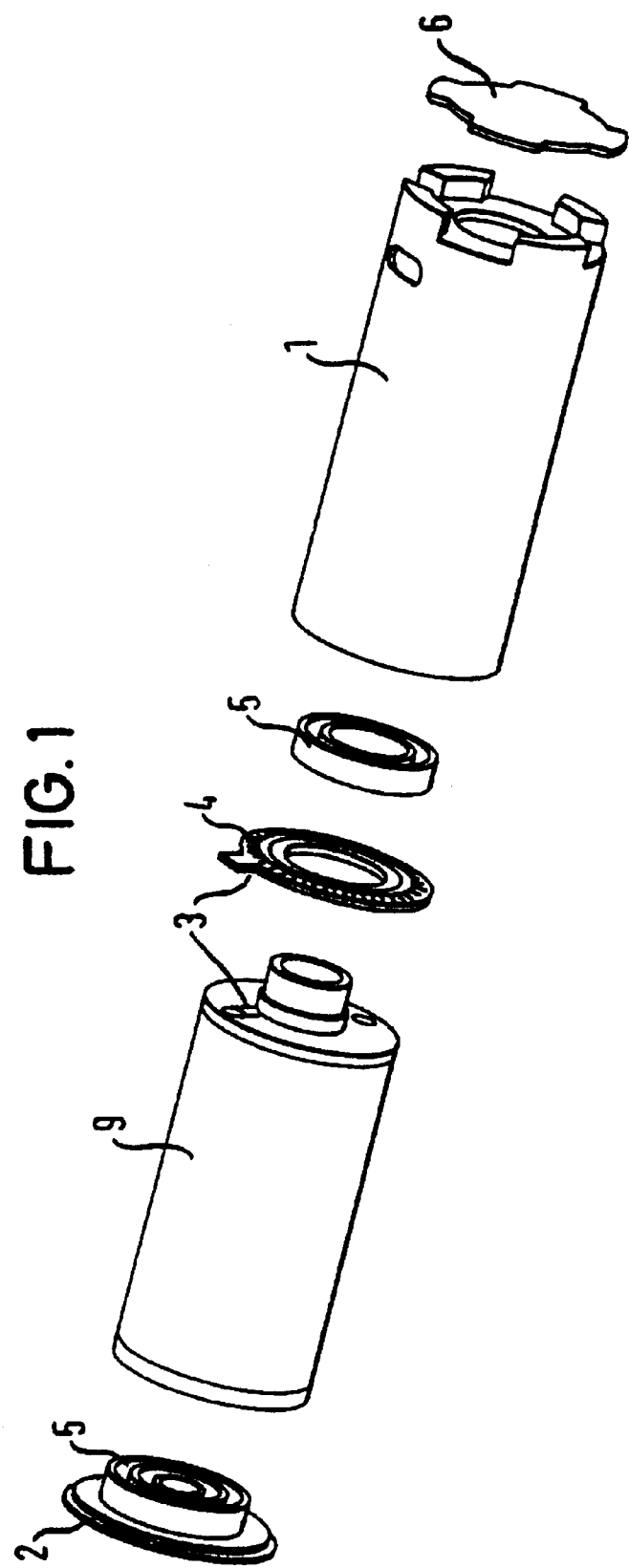
FIG. 1 is an exploded perspective view of a spin rate measurement device in accordance with the invention.

FIG. 1 is an exploded perspective view of a spin rate measurement device in accordance with the invention. It includes a pot-like housing 1 with a cover 2, in which a rotor 9 (platform), designed as a drum-like hollow body, is mounted for rotation by supporting ball bearings 5. Three micromechanical spin rate sensors (not shown in FIG. 1) are arranged in a space inside the rotor 9. The measurement axes of the sensors are each fixed and aligned with one spatial direction. A printed circuit board 6 ("interface board") is connected to the housing 1. The electronics for the external interface (explained in greater detail below with reference to FIG. 2) is located on it, while the electronic assemblies for the drive, resetting, amplifier and processor electronics of the three micromechanical spin rate sensors, as well as the angle pick-off and the drive for the rotor (platform) 9, are located on a second printed circuit board ("processor board") located inside the rotor 9 (not illustrated). A spin angle coder, including optical reading of the spin angle of the rotor 9, is identified by the reference 3, while slip rings 4 are employed for voltage transmission. Data transmission is preferably performed optically (not illustrated). The motor for driving the rotor 9 is also not shown in FIG. 1.

Figure 2:
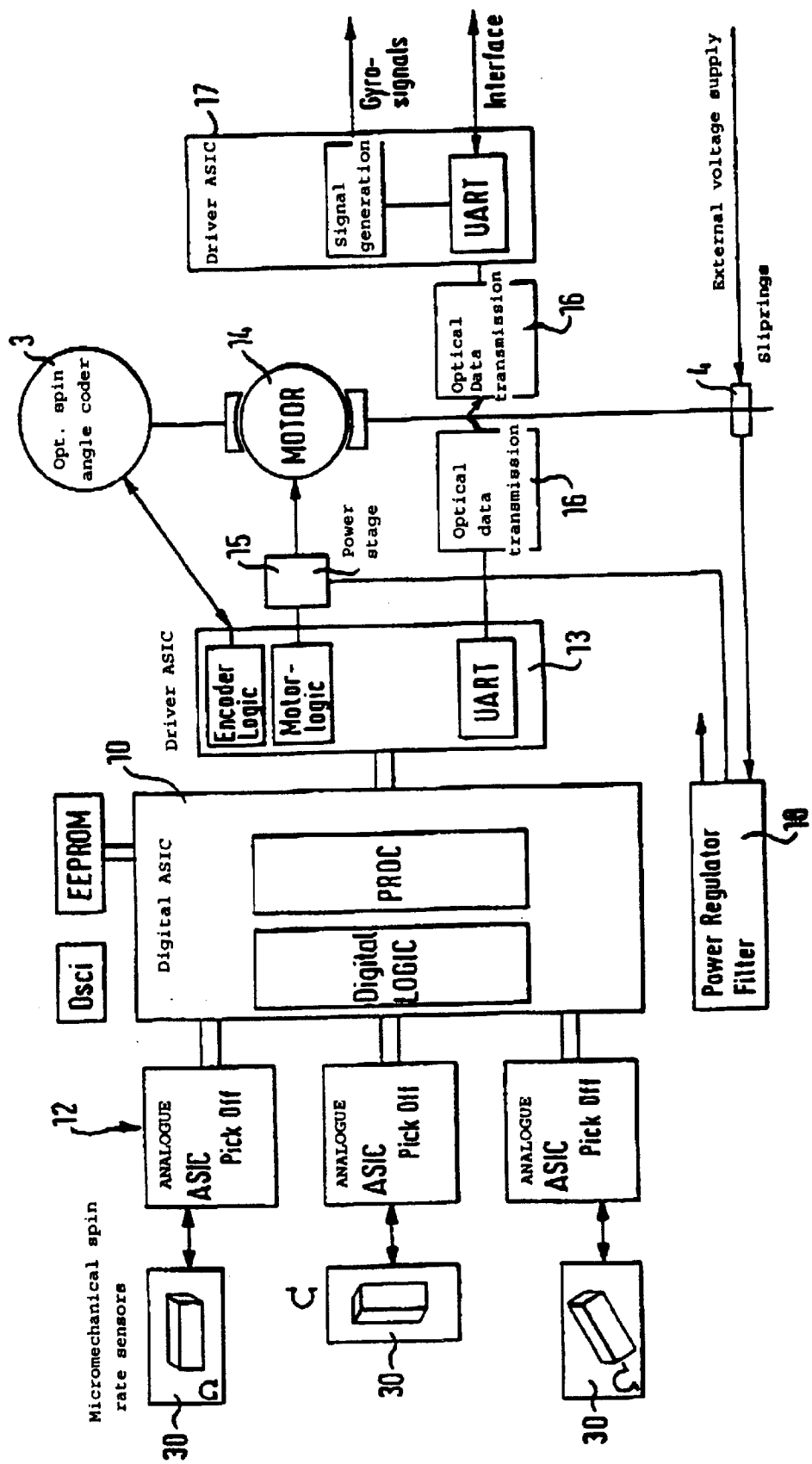
FIG. 2 is a block diagram for illustrating the electronics of the spin rate measurement device.

FIG. 2, a block diagram for illustrating the electronics of the spin rate measurement device, shows all the electronics for three-micromechanical gyros on the stabilized single-axis platform 9. The central block of the electronics is a processor 10 (digital ASIC) which operates both the control loops for the micromechanical spin rate sensors 30 and their associated electronics 12, and a driver ASIC.13. The driver ASIC 13 reads the optical spin angle coder 3 and controls the rotor rotation via a motor 14 and a power stage 15 so that rotor rotation compensates for .the spinning of the missile. All data are passed on via a further driver ASIC 17, using optical data transmission 16. The external voltage supply is passed via the slip rings 4 and is processed internally in the block 18.

Figure 3:
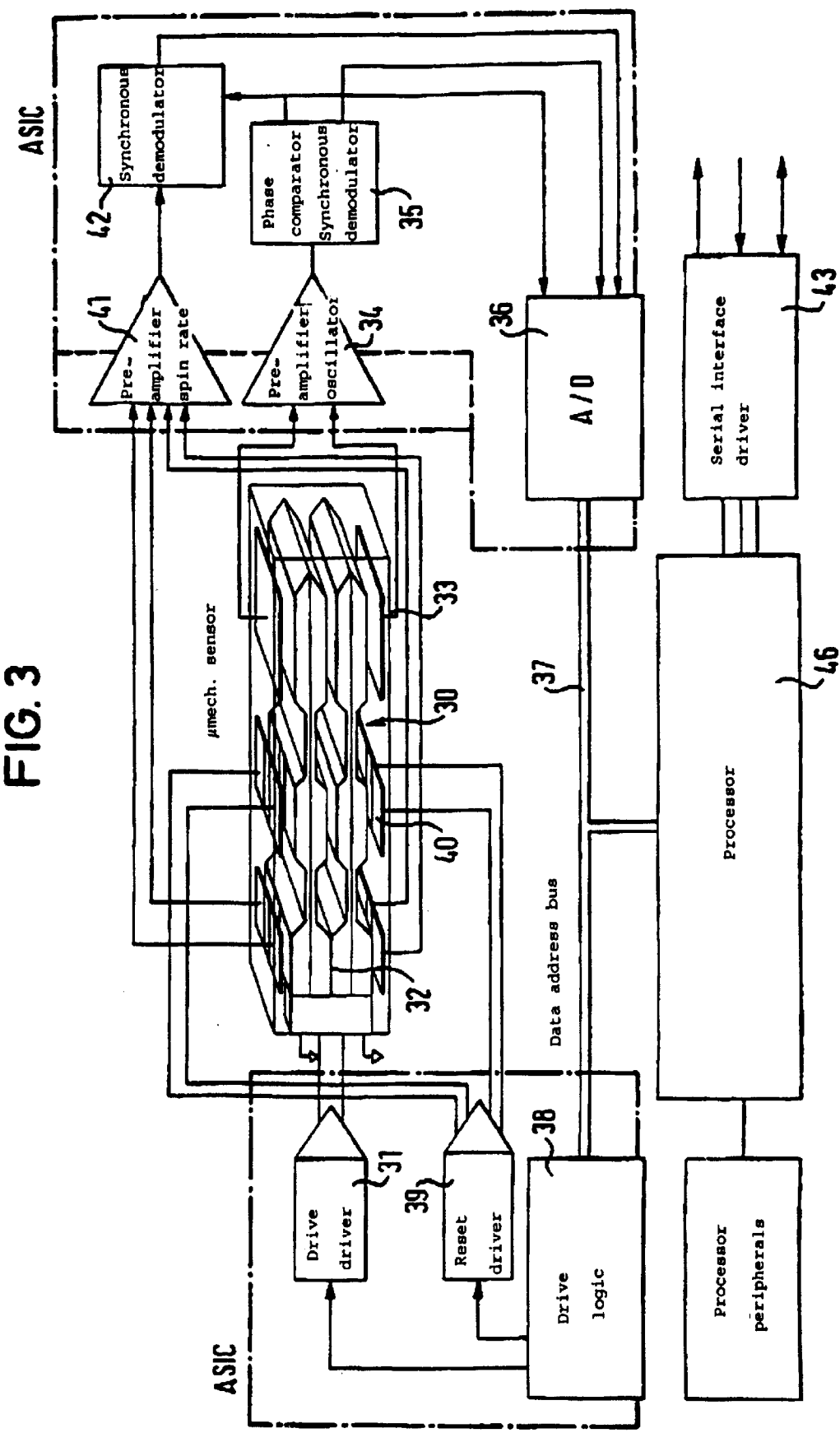
FIG. 3 illustrates a micromechanical spin rate sensor, the figure incorporating the associated drive, reading and resetting electronics.

FIG. 3, illustrates a micromechanical spin rate sensor incorporating the associated drive, reading and resetting electronics. The figure shows the principle of design of a micromechanical spin rate sensor in accordance with the invention based on the Coriolis principle. As can be seen in the figure, the micromechanical spin rate sensor 30 in principle comprises two oscillators in the form of plates, arranged in two levels, like layers, one above the other, that can be excited in antiphase and capacitively excited to oscillate at right angles to their respective plate levels, in which case the drive 31 acts in the region of a very narrow drive gap 32. This leads to comparatively large oscillation amplitudes which are read at the right-hand (preferably free) end of the two oscillators at 33 and transmitted, via a preamplifier 34, to a phase comparator and synchronous demodulator 35, whose output signal is passed via an A/D converter 36 to a data bus 37 to which a processor 46 and drive electronics 38 are connected. The drive electronics 38 produces the driver pulses for the drive 31 and the resetting pulses for a reset driver 39 that capacitively resets the spin rate in the central region 40 of the micromechanical spin rate sensor 30. The capacitive spin rate reading for controlling the resetting pulses is accomplished via top and bottom plate pairs in the drive range (i.e., on the left-hand side of the spin rate sensor 30). The read signals are passed via a preamplifier 41 to a further synchronous demodulator 42 that is fed by the same synchronization clock as the synchronous demodulator 35. Its output signal is likewise passed to the A/D converter group 36 and, from there (via the bus 37) to the processor 46. As shown, individual electronic assemblies, as well as the drive electronics 38, the two drivers 31 and 39 and the assemblies 34, 41, 42 and 35, 36 can be designed as application-specific ASICs (i.e. as an integrated circuit). The measured spin rate is output via the serial interface 43. Open or reset systems may be used as micromechanical spin rate sensors for the envisaged application, such as those described, for example, in the published International Patent Application WO 96/38710, oscillator structures based on the Coriolis principle, have at least two layers and can be excited and read capacitively, preferably with a resetting capability which likewise acts capacitively.

The combination according to the invention of micromechanical spin rate sensors with electromechanical rotation decoupling offers the following functional and economic advantages:

- Three identical gyroscopes can be accommodated on a single-axis platform without any problem;
- The principle of the solution results in the requirements for bias stability being reduced to about 0.33°/s, which, as a rule, are sufficient;
- Scale factor requirements are reduced from 0.02% to 1% due to compensation by the rotating platform;
- In comparison to solution approach (a) with two mechanical gyro systems each having three axes, only a single, single-axis mechanical platform is required; and
- All functions can be completely tested during or at the end of a storage time, so that the risk of functional failure is minimized.

While this invention has been described with reference to its presently-preferred embodiment, it is not limited thereto. Rather, it is limited only insofar as it is described by the following set of patent claims and includes within its scope all equivalents thereof.

What is claimed is:

1. A spin rate measurement device for track/attitude stabilization of rotating missiles, comprising, in combination:

a) three micromechanical spin rate sensors whose three axes are aligned at right angles to one another;

b) said sensors being mounted together on a single axis platform which can be installed on the missiles; and c) one axis of said platform can be rotated by means of a servo loop for rotation decoupling of said spin rate sensors.

2. A spin rate measurement device as defined in claim 1 wherein:

a) said spin rate sensors comprise oscillator structures based on the Coriolis principle;

b) each said sensor.includes at least two layers; and c) said sensors can be capacitively excited and read.

3. A spin rate measurement device as defined in claim 2 wherein said spin rate sensors comprise oscillator structures that can be capacitively reset.

4. A spin rate measurement device as defined in claim 1, characterized in that electronics of the spin rate sensors, a rotor pick-off and a rotor drive are combined in the interior of said platform.

* * * * *